US008667326B2

(12) United States Patent
O'Connor

(10) Patent No.: US 8,667,326 B2
(45) Date of Patent: Mar. 4, 2014

(54) DUAL HARD DISK DRIVE SYSTEM AND METHOD FOR DROPPED WRITE DETECTION AND RECOVERY

(75) Inventor: James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/113,447

(22) Filed: May 23, 2011

(65) Prior Publication Data
US 2012/0304025 A1    Nov. 29, 2012

(51) Int. Cl.
*G06F 11/00*    (2006.01)
(52) U.S. Cl.
USPC ........................................... 714/6.23; 714/54
(58) Field of Classification Search
USPC ........... 714/6.23, 6.1, 6.11, 6.24, 54, 42, 805; 711/114
See application file for complete search history.

(56) References Cited

U.S. PATENT DOCUMENTS

| | | | |
|---|---|---|---|
| 5,469,453 A * | 11/1995 | Glider et al. ................. | 714/6.12 |
| 6,446,235 B1 | 9/2002 | Drottar et al. | |
| 7,020,805 B2 * | 3/2006 | Talagala et al. ................. | 714/42 |
| 7,133,883 B2 * | 11/2006 | Talagala et al. ........................ | 1/1 |
| 7,360,112 B2 | 4/2008 | Durica et al. | |
| 7,409,499 B1 | 8/2008 | Kiselev et al. | |
| 7,454,686 B2 | 11/2008 | Broadbent et al. | |
| 7,472,332 B2 | 12/2008 | Allen et al. | |
| 7,752,489 B2 * | 7/2010 | Deenadhayalan et al. ... | 714/6.12 |
| 8,006,126 B2 * | 8/2011 | Deenadhayalan et al. ..... | 714/6.1 |
| 8,176,405 B2 * | 5/2012 | Hafner et al. ................. | 714/807 |
| 2007/0036055 A1 * | 2/2007 | Ito ............................... | 369/53.35 |
| 2008/0168225 A1 | 7/2008 | O'Connor | |
| 2008/0256420 A1 | 10/2008 | Hafner et al. | |
| 2009/0055584 A1 | 2/2009 | Hafner et al. | |
| 2009/0055688 A1 | 2/2009 | Hafner et al. | |
| 2009/0132851 A1 | 5/2009 | Pruthi | |
| 2010/0088579 A1 * | 4/2010 | Hafner et al. ................. | 714/807 |

* cited by examiner

*Primary Examiner* — Dieu-Minh Le
(74) *Attorney, Agent, or Firm* — Cantor Colburn LLP; Steven Chiu

(57) ABSTRACT

A system is provided. The system detects a dropped write from a hard disk drive (HDD). The system includes two or more HDDs, each being configured to define a data block spread across the two or more HDDs. The data block is configured to regenerate a checksum across the full data block during a read operation to detect the dropped write.

19 Claims, 3 Drawing Sheets

DUAL HARD DISK DRIVE SYSTEM AND METHOD FOR DROPPED WRITE DETECTION AND RECOVERY

BACKGROUND

The present invention relates to a dual hard disk drive system for dropped write detection and recovery.

Computer systems often require a considerable amount of nonvolatile disk storage to preserve software, programs and other data that cannot fit in the smaller more costly RAM memory and that otherwise would be lost when the systems are turned off. At present, it is common for these storage systems to be built using a large number of Hard Disk Drives (HDDs). HDDs are constructed using one or more disk shaped platters coated with a magnetic material. The disk platters spin at fixed speeds and a movable arm with a read/write head is directed to specific locations on the disk to write and/or read data. The head assembly glides just above the surface of the platter. During data write operations, the head assembly applies an electric field to a specific location on the disk creating a substantially permanent magnetic field in a specific direction. If the field points in one direction it represents a binary "1" and if it points in the other direction is represents a binary "0". The head assembly is designed to read stored data by sensing the small current induced in the head assembly by the magnetic field when in passes over the magnetized location on the platter. When the HDD is powered off, the data is preserved by the magnetic signature.

HDD platters are partitioned into concentric circles, called tracks, which are coincident with areas over which the head glides when the arm assembly remains motionless. Each track is further partitioned into sectors. Each sector contains a larger fixed length area for data as well as header and trailer information used by the HDD electronics during the data storing and retrieval process. Data read and write times, called latency, are not fixed and predictable as they are in RAM. The latency, to a large extent, is a function of the seek time, the time it takes the arm to reposition the head over the track where the data is to be stored or retrieved. That time is variable and a function of the last position of the arm.

HDDs are typically designed as self contained assemblies that can be plugged into standard slots in computer chassis or in a separate storage chassis. Separate storage drawers typically hold anywhere from a half dozen to as may as 50 or more individual HDDs. A storage chassis can be either a standalone assembly or a rack mountable unit to allow multiple drawers to be placed into a single rack creating a relatively large array of HDDs in a small physical foot print. Drive density per unit area floor space is a competitive metric used in the industry to help potential customers compare offerings from different vendors.

SUMMARY

According to an aspect of the present invention, a system is provided. The system detects a dropped write from a hard disk drive (HDD). The system includes two or more HDDs, each being configured to define a data block spread across the two or more HDDs. The data block is configured to regenerate a checksum across the full data block during a read operation to detect the dropped write According to another aspect of the present invention, a method is provided. The method detects a dropped write from a hard disk drive (HDD) and includes defining a data block across two or more HDDs and regenerating a checksum across the full data block during a read operation to detect the dropped write.

According to another aspect of the present invention, a computer program product for detecting a dropped write from a hard disk drive (HDD) is provided. The computer program product includes a tangible storage medium readable by a processing circuit and storing instructions for execution, by the processing circuit, a method. The method includes defining a data block across two or more HDDs and regenerating a checksum across the full data block during a read operation to detect the dropped write.

According to yet another aspect of the invention, a system for detecting a dropped write from a single hard disk drive (HDD) with multiple platters is provided. The system includes two or more HDD platters, each being configured to define a data block spread across the two or more HDD platters. The data block is configured to regenerate a checksum across the full data block during a read operation to detect the dropped write.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
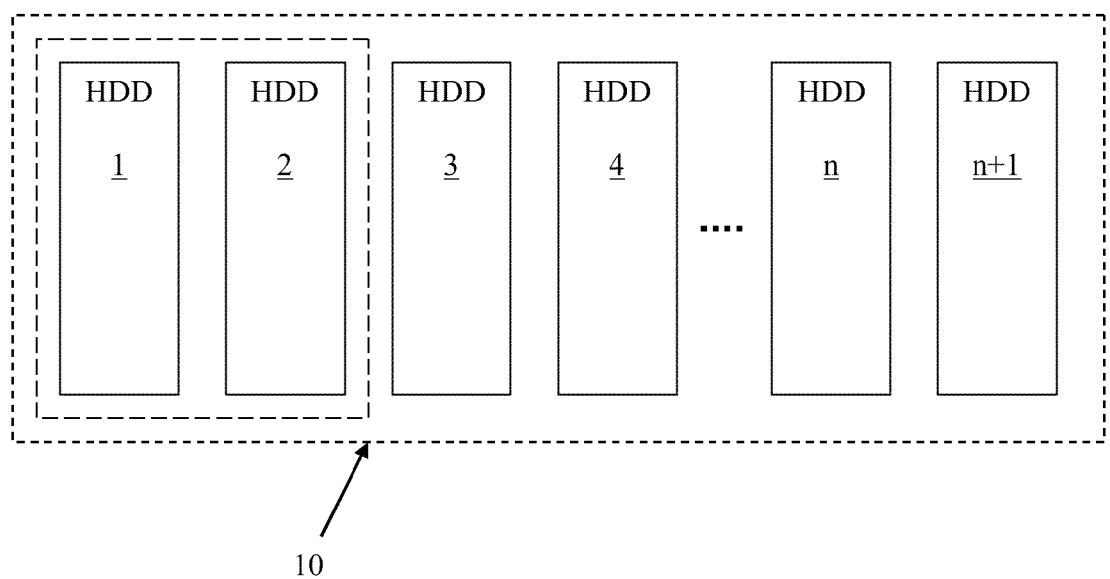
FIG. 1 is a schematic illustration of a hard disk drive (HDD) array.

Hard disk drives (HDDs) are complex electro-mechanical subassemblies and, as such, are subject to a wide variety of failure mechanisms. Microscopic defects in the magnetic coding materials used on the platter, contamination of the platter with dust, dirt or magnetic particles and aging can all cause data loss. As with all electronics, random failures can also occur from a wide variety of underlying physical processes or small defects associated with manufacturing processes. Moving parts are subject to friction and wear out over time which can also cause HDD assemblies to fail.

Not all HDD failures manifest themselves as a solid hard failure of the entire HDD assembly, however. Some problems are more subtle and can be difficult to detect. The precision in locating the magnetic read/write head at the exact position on the platter to ensure the correct data is written or read is crucial. Slight variations can result in data being written to the wrong location or read back from the wrong location. Such erroneous data that appears to be good data read from the HDD will be hereinafter referred to as a "dropped write" error.

HDD technologies continue to evolve in that higher density and faster devices, utilizing new and different disk designs are being created at an ever accelerating rate. As HDD rotational speeds continue to increase and as HDDs continue to be designed to hold ever increasing amounts of data, the physical area on a disk that holds the magnetic signature for each bit continues to become smaller and smaller making it an even greater engineering challenge to ensure reliable write and read operations.

A technique to detect and correct bit errors involves the generation of odd or even parity where the number of 1's or 0's in a data word are XOR-ed together to produce a parity bit. For example, a data word with an even number of 1's will have a parity bit of 0 and a data word with an odd number of 1's will have a parity bit of 1. If there is a single error produced in the data word, it can be detected by regenerating parity from the data and then checking to see that it matches the originally generated parity.

This parity technique can detect errors and correct errors by appending an XOR field and an error correct code (ECC) field to each code word. The ECC field is a combination of different bits in the word XOR-ed together so that errors (small changes to the data word) can be easily detected, pinpointed and corrected. The number of errors that can be detected and corrected are directly related to the length of the ECC Field as long as a minimum separation distance between valid data words and code word combinations can be ensured. Thus, error detection and error correction techniques may be used to restore data in noisy communication transmission media or for storage media where there is a finite probability of data errors due to the physical characteristics of the device.

Techniques, such as the technique discussed above, have been extended to help ensure HDD failures do not cause data loss or data integrity issues due to subtle failure modes. Embedded checkers, such as ECCs, are used on HDDs to detect bad sectors. Cyclic Redundancy Checks (CRCs) and Longitudinal Redundancy Checks (LRCs) may be embedded checkers used by HDD electronics or disk adapters or they may be checkers used by higher levels of code and applications to detect HDD errors. CRCs and LRCs are written coincident with data to help detect data errors and are hashing functions used to produce a small, substantially unique bit pattern generated from the data. When the data is read from the HDD, a checksum is regenerated and compared to that stored on the platter. The signatures must match exactly to ensure the data retrieved from the magnetic pattern encoded on the disk is as was originally written to the disk.

Further extensions include the use of Redundant Array of Independent Disks (RAID) systems, which have been developed to improve performance and/or to increase the availability of disk storage systems. RAID distributes data across several independent HDDs and may be used in many different RAID schemes that have been developed, with each scheme having different characteristics and different pros and cons. Of these, performance, availability and utilization/efficiency (i.e., the percentage of the disks that actually hold customer data) are perhaps the most important. The tradeoffs associated with various schemes have to be carefully considered because improvements in one attribute can often result in reductions in another.

For further discussion of RAID, it is noted that some inconsistency and ambiguity in RAID related terminology exists. Thus, the following definitions will be used for clarity in the present disclosure. An array is a collection of HDDs on which one or more instances of a RAID erasure code is implemented. An element is a fundamental unit of data or parity, the building block of the erasure codes. In coding theory, this is the data assigned to a bit within a symbol, which is a set of sequential sectors. An element is composed of a fixed number of bytes. It is also common to define elements as a fixed number of blocks. A block a fixed number of bytes. A stripe is a complete and connected set of data and parity elements that are dependently related to the parity computation relations. In coding theory, the stripe is the code word or code instance. A strip is a collection of contiguous elements on a single HDD and contains data elements and/or parity elements from the same disk and stripe. The terms strip and column may be used interchangeably. In coding theory, the strip is associated with the code word and is sometimes called the stripe unit. It is common for strips to contain the same number of elements. In some cases, stripes may be grouped together to form a higher level construct know as a stride.

In RAID-0 systems, striping of data across multiple HDDs is used to improve performance. In RAID-1 systems, data is mirrored such that 2 exact copies of the data is maintained on 2 different HDDs to improve availability. Some RAID schemes can used together to gain combined benefits. For example, RAID-10 systems include data striping and mirroring across several HDDs in an array to improve both performance and availability.

In RAID-5 systems, a single parity field is used and is the XOR (exclusive OR) of the data elements across multiple unique HDDs. In an event of a single HDD failure, the data on the remaining HDDs is used to reconstruct the data from the failed HDD by XOR-ing the data on the remaining disks together to recreate the data from the failed disk. As with many other RAID schemes, RAID5 has a performance advantage in that the data from all HDDs in a data stripe does not have to be read to recalculate the new parity value for the stripe every time a write occurs. When writing small amounts of data or updating single data elements, a technique known as read-modified-write is used whereby the old data from a single HDD is read along with the old parity from another HDD. The old data is XOR-ed with the new data and old parity to produce the new parity, which is then written along with the new data. This can be a considerable performance improvement especially with wider width (larger N–N+P) RAID5 arrays. RAID5 uses a distributed parity scheme whereby parity is substantially uniformly distributed across all the HDDs in the array to help balance read/write access to each HDD to ensure more consistent performance.

RAID5 arrays can continue to operate after a complete HDD failure. Data from the failed disk can be regenerated by XOR-ing data from the remaining disks with the parity. When the failed HDD is replaced or if there is a spare HDD in a RAID5 array, the data from the failed HDD can be completely recreated and rewritten to the new disk using the same XOR process. These HDD rebuilds can often take several hours to complete. If another disk in the RAID5 array fails before the first failed HDD is replaced and the data is rebuilt on the new disk all the data associated with the RAID5 array will be lost. Moreover, RAID5 can only tolerate a single HDD failure. There is no way to reconstruct the data when 2 HDDs fail. The probability of encountering a second HDD failure is directly related to how quickly the failed HDD is replaced or spared out and the data reconstructed and written to the replacement/spare HDD.

RAID6 is an extension to RAID5, in which a second independent checksum field is introduced. Where RAID5 can continue to operate in the presence of a single HDD failure, RAID6 can continue to operate in the presence of 2 HDD failures. In RAID6, the second independent checksum field can be created using Reed-Solomon coding or via simple RAID5 like XORs where no data element of the XOR is used more than once to generate the checksums.

One HDD failure mode that is particularly troublesome is dropped writes. Dropped writes occur when a disk controller issues a write command to an HDD and receives a good status report back from the HDD indicating the write completed successfully. However, in some cases, the write to the HDD did not actually occur. Although normally rare, there are a variety of failure mechanisms that can cause dropped writes. Subtle or intermittent failure of the write heads can cause a dropped write. A code problem in the HDD assembly could cause it as well. If the head is slightly off track the data can be written to the wrong track.

RAID5 requires that the HDD in the array with the fault be identified by some other independent detection system. Likewise, in order for RAID6 to correct 2 HDD faults, those faults must be pinpointed by some independent detection mechanism. What is particularly troublesome about dropped writes, however, is that embedded checkers, such as ECCs used on HDDs to detect bad sectors, as well as CRCs and LRCs that are used by the disk controller/disk adapter or higher levels of code and applications, may prove ineffective in detecting dropped write errors. These checkers cannot always detect a dropped write because the data read from the disk location is not necessarily bad content. It may just be the old data that was not overwritten by new data when it should have been so all the checkers may still be valid for the old data.

With this said, it is possible to detect dropped writes through a "parity scrub" whereby all the data from a stripe is read across all the HDDs in the array, parity is regenerated from the data and the parity is compared to the parity originally computed and saved on the disk. However, many RAID operations such as read modified writes do not completely regenerate parity and compare on every read and write operation. To do so would represent substantial performance degradation. Readback checks, where data is immediately read from a disk after a write and compared to what was intended to be written, could detect some of these problems, but they too represent a huge performance degradation if used on every write. In addition, if the dropped write is due to a problem of the head assembly settling above the wrong track, a read back write check may not detect that problem because the head may still be positioned over wrong track.

Since dropped writes can be difficult to detect, there is concern that they could potentially cause serious customer data corruption and restoration issues. Every read modified write using bad data from a dropped write, serves to further propagate the data errors to other HDDs in the RAID array causing migration of the data corruption and making it all the more difficult to determine which HDD originally caused the problem. In some scenarios, the propagation of an undetected dropped write or a dropped write that is not immediately detected can modify the RAID checksum in a way that makes it impossible to detect the dropped write condition even with a RAID parity scrub (i.e., the dropped write may become hidden).

Even when RAID techniques generate a checksum that is a mismatch if the HDD does not detect the error, there is no independent mechanism to pinpoint the HDD with the failure and thus RAID will be useless.

Figure 3:
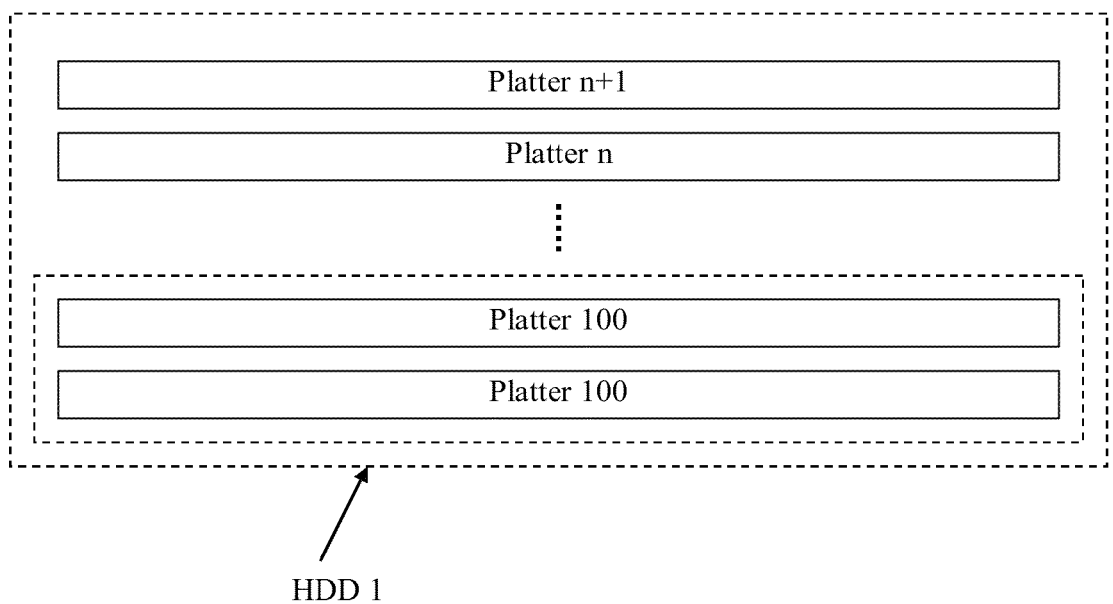
FIG. 3 is a schematic illustration of a single HDD with multiple platters.

With reference to FIGS. 1 and 3, aspects of the present invention are directed to the elimination of exposure to dropped writes in an HDD array of a storage subsystem 10 including physical HDDs 1, 2, 3, 4, . . . , n, n+1 (see FIG. 1), each of which may have a RAID configuration (i.e., RAID1, RAID5, RAID6), or, as shown in FIG. 3, a single HDD 1 with multiple platters 100, 101, . . . , n, n+1 in a similar configuration. The elimination of the exposure to dropped writes is achieved by spreading a data block across two or more of the physical HDDs (i.e., HDD 1 and HDD 2, as shown in FIG. 1) or across two or more of the multiple platters in a single HDD 1 (i.e., platter 100, 101). In doing so, the particularly troublesome dropped write failure modes can no longer effect the entire data block.

As mentioned above, dropped writes occur when a disk controller issues a read command to an HDD and receives a good status report back from the HDD even though incorrect data has been returned. Although normally rare, there are a variety of failure mechanisms that can cause dropped writes. This condition could have been a write that appeared to complete successfully even though the write to the HDD did not actually occur. Subtle or intermittent failure of the read/write heads can cause a dropped write. If the head is slightly off track the data can be written to the wrong track or read from the wrong track. A code problem in the HDD assembly could cause it as well.

However, in accordance with the aspects of the present invention, by spreading the data block across at least two or more of the HDDs, a dropped write failure can be detected and can no longer produce what appears to be completely good data.

In one exemplary embodiment, the data block is spread across HDD 1 and HDD 2 so that roughly half the sectors associated with a single data block are disposed on HDD 1 and half are disposed on HDD 2 along with meta data such as a checksum (e.g. CRC, LRC, etc. . . . ). A checksum calculated across the data block spread across HDD 1 and HDD 2 is necessary to ensure the drop write is detected since the probability of both HDD 1 and HDD 2 experiencing a dropped write error on the exact same read request is virtually zero under normal conditions.

Figure 2:
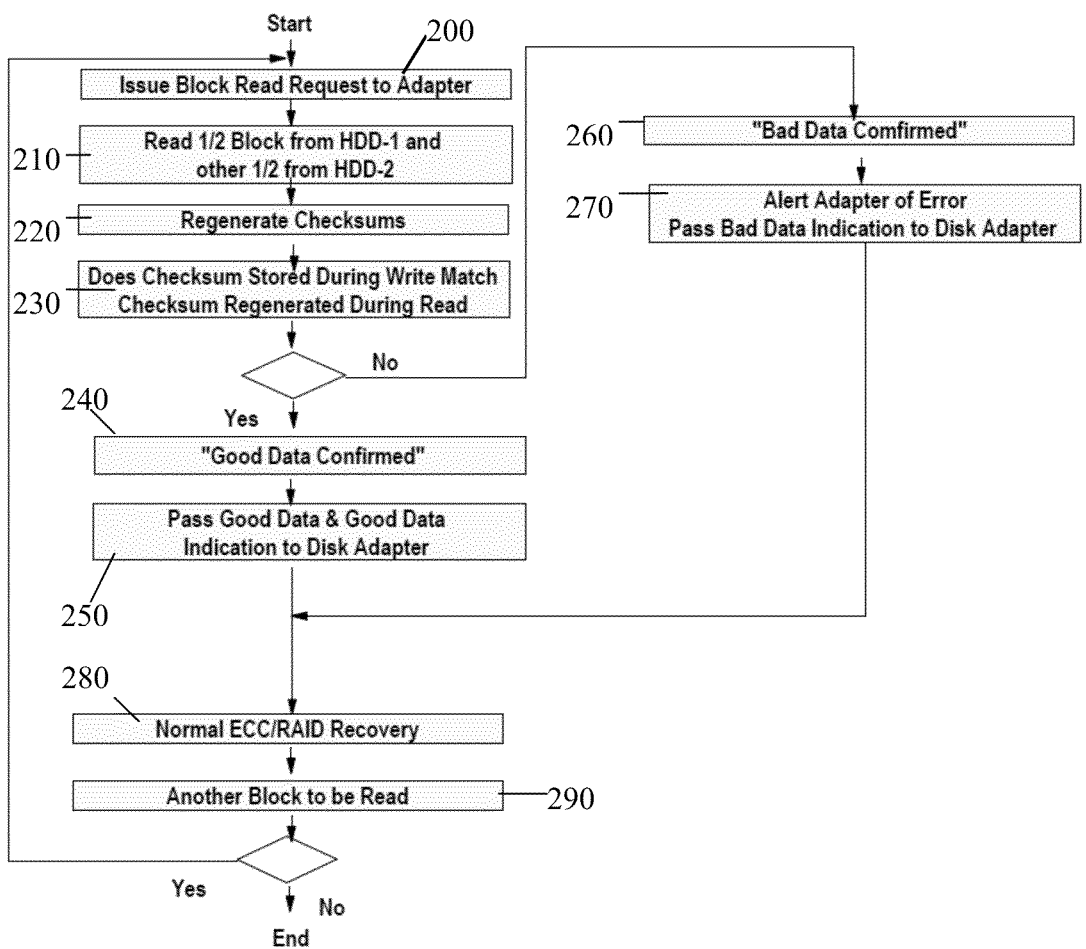
FIG. 2 is a flow diagram illustrating a method for dropped write detection and recovery.

In detail, as shown in FIG. 2, once a read request has been initiated, the read request is issued to an adapter (operation 200). The adapter then reads half a block from HDD 1 and half the block from HDD 2 (operation 210) and regenerates the checksum(s) for the data block (operation 220). It is then determined whether the checksum that was stored during the write operation for the data being read matches the checksum that was regenerated (operation 230) and, if a match is found, good data is confirmed (operation 240) and the good data is passed along with the good data indication to the adapter (operation 250). If a match is not found, however, bad data is confirmed (operation 260) and the adapter is alerted with a bad data indication (operation 270). Following operations 250 and 270, normal ECC/RAID recovery can be commenced (operation 280) and a determination can be made if another block is to be read (operation 290). If no other block is to be read, control ends and, if another block is to be read, control returns to operation 200.

Average read and write performance would not be affected negatively by the spreading of the data block across the two or more HDDs. In fact, spreading data across multiple HDDs and short stroking could potentially improve overall performance. The total number of HDD for comparable storage capacity would remain essentially the same also, since each disk pair would have double the storage capacity of a single HDD.

In the embodiment where the data block is written across two HDDs and a failure occurs (i.e., if there is a head misalignment on either HDD during a write or read operation), only half the data block will be affected. Thus, a checksum mechanism can be used to detect the dropped write condition since it will occur on only one of the two HDDs. As noted above, the block is read by reading half the data from one of the HDDs and the other half from the other. Since the probably of encountering a dropped write is normally very low, only one disk at a time would exhibit the dropped write. This means half the data returned will be the correct data and the other half of the data associated with the dropped write will be the incorrect data. Even if the sector checking of each disk looks OK, when the total block CRC is regenerated, it will no longer match the total block CRC that was read from the HDD. The fault will be pinpointed to the disk pair and, thus, normal RAID techniques can be used to restore the data.

In accordance with alternative embodiments, the data block could be written across multiple magnetic platters in a single hard drive. A similar technique can be applied to a multi-platter single hard drive although care would need to be taken that multiple heads do not both mis-align when there is a single actuator arm or because the same code or logic bug is encountered.

Technical effects and benefits of the present invention include providing a system for detecting a dropped write from a hard disk drive (HDD). The system includes two or more HDDs, each being configured to define a data block spread across the two or more HDDs and the data block is configured to regenerate a checksum across the full data block during a read operation to detect the dropped write.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for detecting a dropped write from a hard disk drive (HDD), the system comprising:
   two or more HDDs, each being configured to define a data block spread across the two or more HDDs,
   the data block being configured to regenerate a checksum across the full data block during a read operation to detect the dropped write, the system further comprising:
   an adapter configured to read the data block from each of the two or more HDDs and to regenerate the checksum for the data block, the adapter being receptive of:
   good data and a good data indication in an event the regenerated checksum matches a checksum stored during a write operation for data of the data block; and
   a bad data indication in an event the regenerated checksum does not match the checksum stored during the write operation for the data of the data block.

2. The system according to claim 1, wherein the regenerated checksum is comparable with a previously stored checksum to detect the dropped write.

3. The system according to claim 1, wherein the two or more HDDs are configured as a Redundant Array of Independent Disks (RAID).

4. The system according to claim 3, wherein RAID1 is used.

5. The system according to claim 3, wherein RAID5 is used.

6. The system according to claim 3, wherein RAID6 is used.

7. A method of detecting a dropped write from a hard disk drive (HDD), the method comprising:
   defining a data block across two or more HDDs; and
   regenerating a checksum across the full data block during a read operation to detect the dropped write, and the method further comprising:
   configuring an adapter to read the data block from each of the two or more HDDs and to regenerate the checksum for the data block, the adapter being receptive of:
   good data and a good data indication in an event the regenerated checksum matches a checksum stored during a write operation for data of the data block; and
   a bad data indication in an event the regenerated checksum does not match the checksum stored during the write operation for the data of the data block.

8. The method according to claim 7, further comprising:
   comparing the regenerated checksum to a previously stored checksum;
   determining whether the regenerated checksum matches the previously stored checksum; and
   determining that the dropped write exists if no match exists.

9. The method according to claim 7, further comprising configuring the two or more HDDs as a Redundant Array of Independent Disks (RAID).

10. The method according to claim 9, wherein RAID1 is used.

11. The method according to claim 9, wherein RAID5 is used.

12. The method according to claim 9, wherein RAID6 is used.

13. A non-transitory computer program product for detecting a dropped write from a hard disk drive (HDD), the computer program product comprising:
    a tangible storage medium readable by a processing circuit and storing instructions for execution, by the processing circuit, to perform a method comprising:
    defining a data block across two or more HDDs; and
    regenerating a checksum across the full data block during a read operation to detect the dropped write, the computer program product further comprising:
    an adapter configured to read the data block from each of the two or more HDDs and to regenerate the checksum for the data block, the adapter being receptive of:
    good data and a good data indication in an event the regenerated checksum matches a checksum stored during a write operation for data of the data block; and
    a bad data indication in an event the regenerated checksum does not match the checksum stored during the write operation for the data of the data block.

14. The non-transitory computer program product according to claim 13, the method further comprising:
    comparing the regenerated checksum to a previously stored checksum;
    determining whether the regenerated checksum matches the previously stored checksum; and
    determining that the dropped write exists if no match exists.

15. The non-transitory computer program product according to claim 13, the method further comprising configuring the two or more HDDs as a Redundant Array of Independent Disks (RAID).

16. The non-transitory computer program product according to claim 13, wherein RAID1 is used.

17. The non-transitory computer program product according to claim 13, wherein RAID5 is used.

18. The non-transitory computer program product according to claim 13, wherein RAID6 is used.

19. A system for detecting a dropped write from a single hard disk drive (HDD) with multiple platters, the system comprising:

two or more HDD platters;
a data block spread across the two or more HDD platters such that at least a first portion of the data block is stored to a first one of the HDD platters and a second data block is stored to a second one of the HDD platters; and
a checksum calculated across the data block spread across the two or more HDD platters,
the data block being configured to regenerate the checksum across the full data block during a read operation to detect the dropped write, the system further comprising:
an adapter configured to read the data block from each of the two or more HDDs and to regenerate the checksum for the data block, the adapter being receptive of:
good data and a good data indication in an event the regenerated checksum matches a checksum stored during a write operation for data of the data block; and
a bad data indication in an event the regenerated checksum does not match the checksum stored during the write operation for the data of the data block.

* * * * *